United States Patent
Sakai et al.

(10) Patent No.: US 9,625,491 B2
(45) Date of Patent: Apr. 18, 2017

(54) SCANNING MECHANISM AND SCANNING PROBE MICROSCOPE

(71) Applicant: OLYMPUS CORPORATION, Tokyo (JP)

(72) Inventors: Nobuaki Sakai, Hachioji (JP); Yoshitsugu Uekusa, Tachikawa (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/614,550

(22) Filed: Feb. 5, 2015

(65) Prior Publication Data

US 2015/0153385 A1    Jun. 4, 2015

Related U.S. Application Data

(63) Continuation of application No. PCT/JP2013/070104, filed on Jul. 24, 2013.

(30) Foreign Application Priority Data

Aug. 8, 2012  (JP) ................................. 2012-176243

(51) Int. Cl.
*G01Q 10/00*  (2010.01)
*G01Q 10/04*  (2010.01)
*G01Q 20/02*  (2010.01)

(52) U.S. Cl.
CPC ............. *G01Q 10/00* (2013.01); *G01Q 10/04* (2013.01); *G01Q 20/02* (2013.01)

(58) Field of Classification Search
None
See application file for complete search history.

(56) References Cited

U.S. PATENT DOCUMENTS

| | | | |
|---|---|---|---|
| 6,246,054 B1* | 6/2001 | Toda ...................... | B82Y 35/00 850/1 |
| 2008/0011065 A1* | 1/2008 | Su ......................... | B82Y 35/00 73/105 |
| 2011/0093989 A1* | 4/2011 | Fukuma ................. | B82Y 35/00 850/1 |
| 2013/0271757 A1* | 10/2013 | Kang ..................... | A61B 3/102 356/300 |

FOREIGN PATENT DOCUMENTS

| | | | |
|---|---|---|---|
| JP | 4-60402 | * | 2/1992 |
| JP | 4-60402 A | | 2/1992 |
| JP | 2000-056035 A | | 2/2000 |

(Continued)

OTHER PUBLICATIONS

JP 4-60402 machine translation.*

(Continued)

*Primary Examiner* — Andrew Smyth
(74) *Attorney, Agent, or Firm* — Scully, Scott, Murphy & Presser, P.C.

(57) ABSTRACT

A scanning mechanism includes a movable portion to which a scanning target object is attached, and an X-Y actuator to scan the movable portion in an X direction and a Y direction perpendicular to the X direction. The X-Y actuator is symmetrical with respect to a straight line parallel to the Y direction and asymmetrical with respect to a straight line parallel to the X direction.

25 Claims, 12 Drawing Sheets

(56) References Cited

FOREIGN PATENT DOCUMENTS

| JP | 2000056035 A | * | 2/2000 | | |
|---|---|---|---|---|---|
| JP | 2002-082036 A | | 3/2002 | | |
| JP | 2002082036 A | * | 3/2002 | | |
| JP | 2010-521693 A | | 6/2010 | | |
| JP | 2010-190657 A | | 9/2010 | | |
| JP | 2010190657 A | * | 9/2010 | | |
| WO | WO 2008115862 A2 | * | 9/2008 | ............. | G01Q 10/02 |
| WO | WO 2008115862 A3 | * | 11/2008 | ............. | G01Q 10/02 |

OTHER PUBLICATIONS

English translation of International Preliminary Report on Patentability together with the Written Opinion, dated Feb. 19, 2015 received in related International Application No. PCT/JP2013/070104.
International Search Report dated Sep. 3, 2013 issued in PCT/JP2013/070104.
English Abstract of WO 2008/115862 A2, dated Sep. 25, 2008.
Japanese Office Action dated Mar. 8, 2016 received in Japanese Application No. 2012-176243, together with an English-language translation.

* cited by examiner

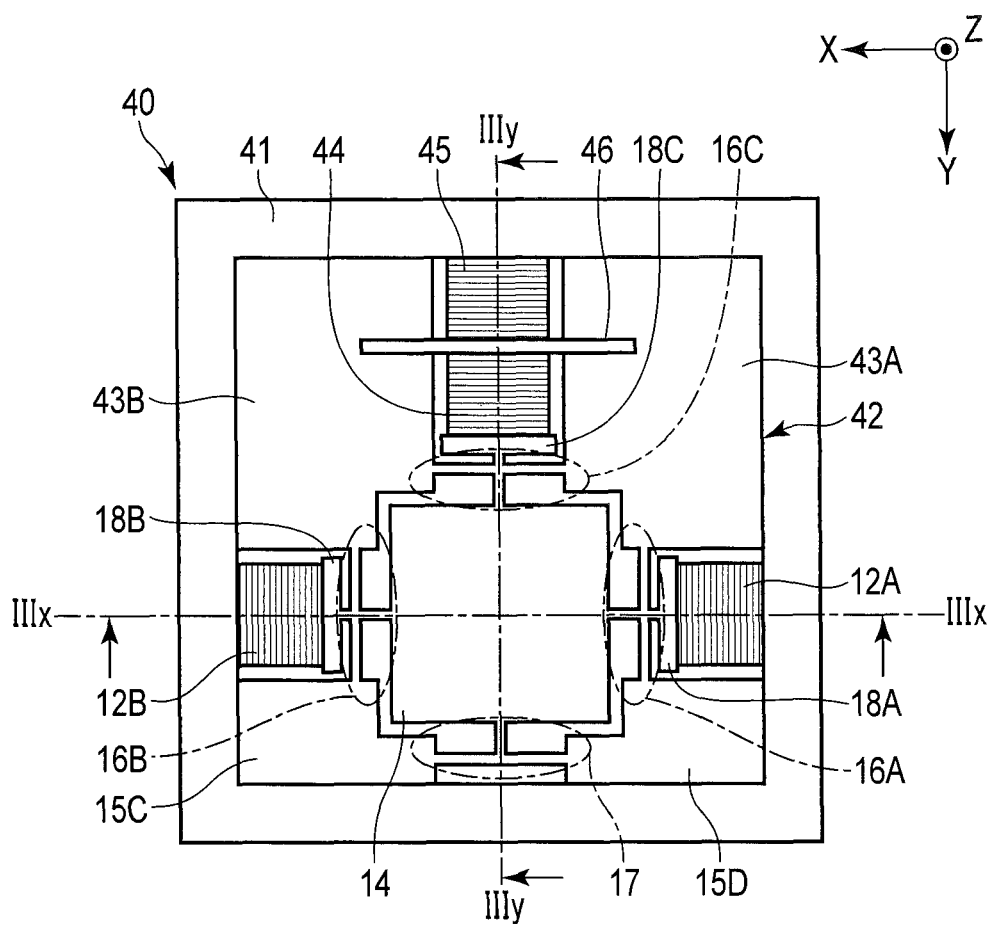
F I G. 5A
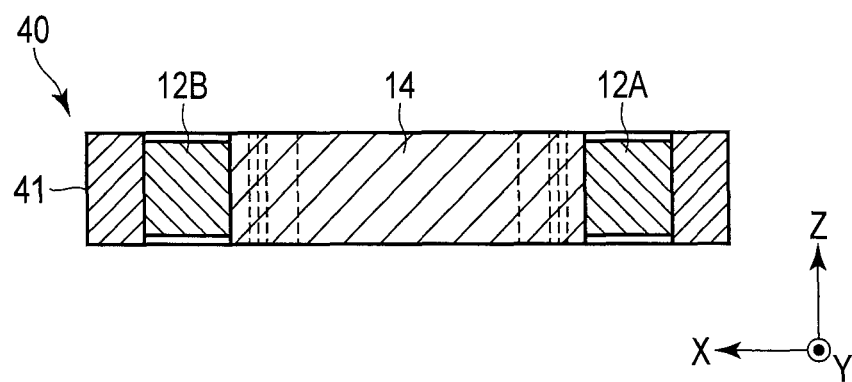
F I G. 5B

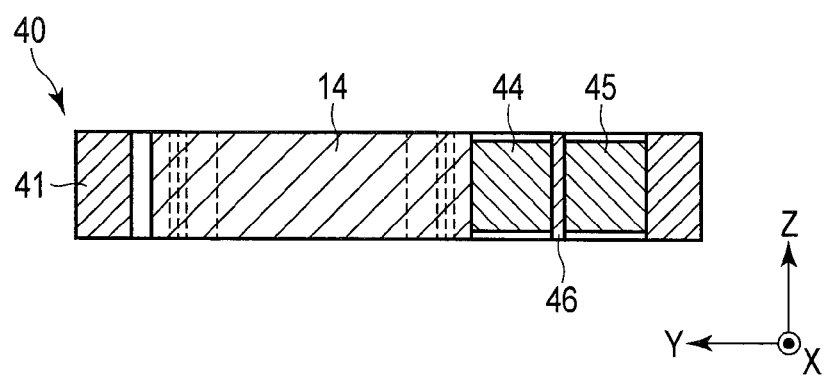
F I G. 5C
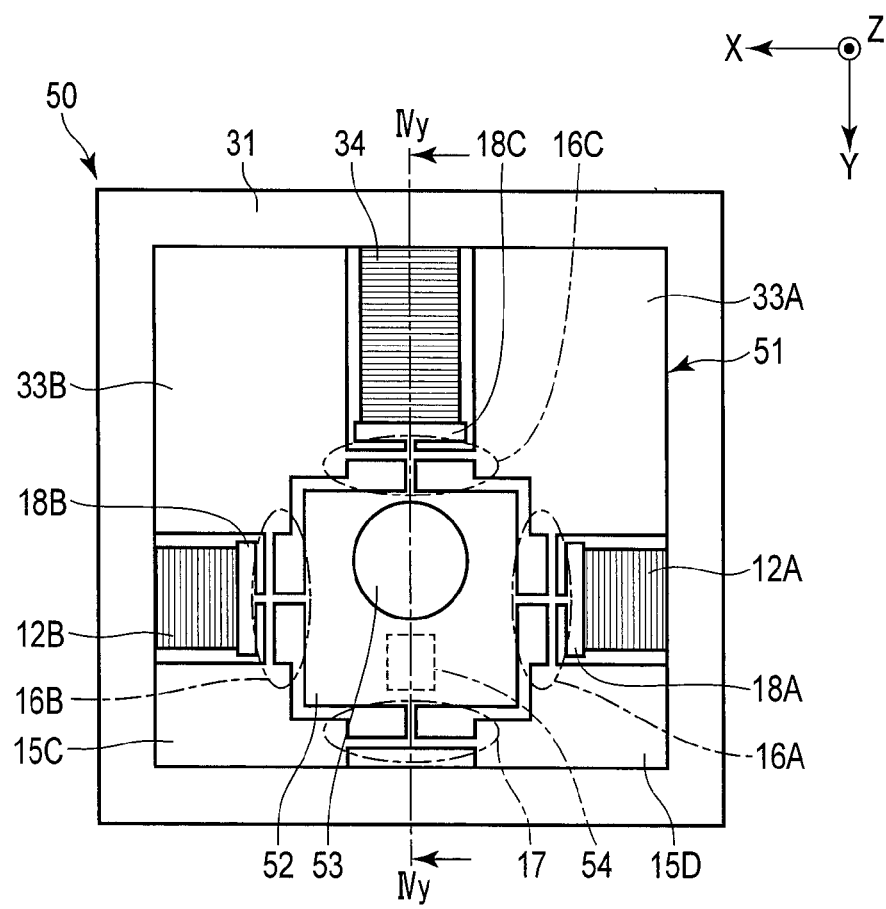
F I G. 6A

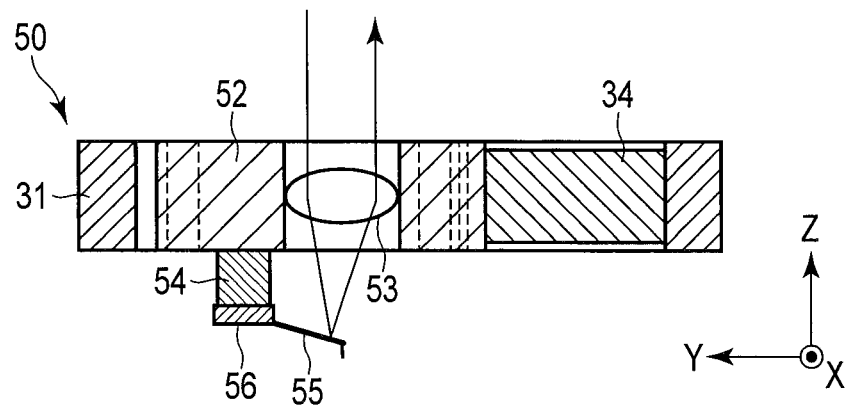
F I G. 6B
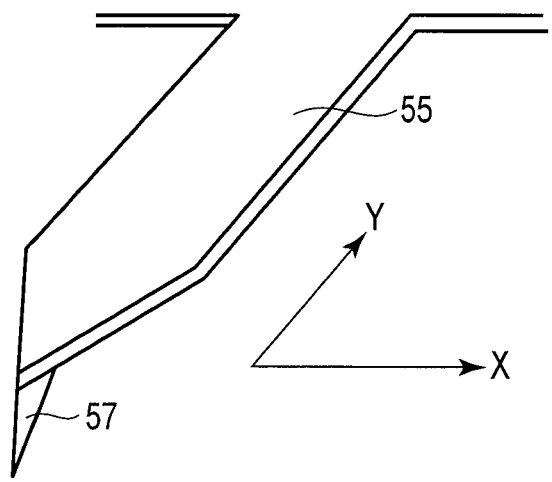
F I G. 7A

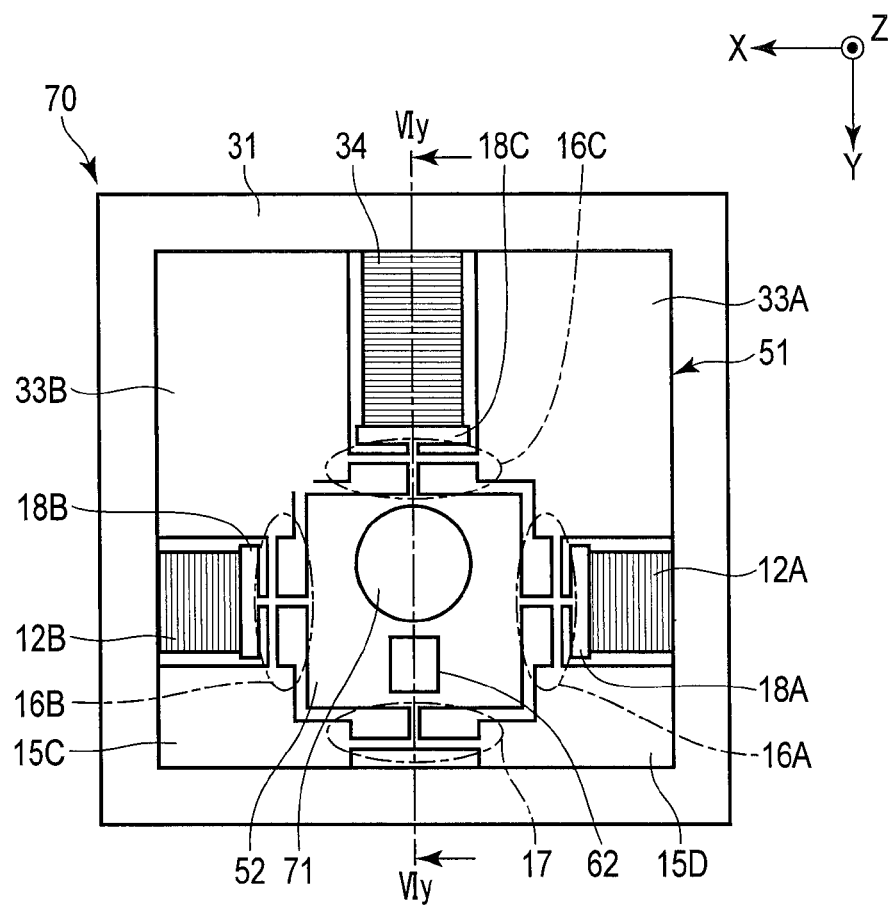
F I G. 10A
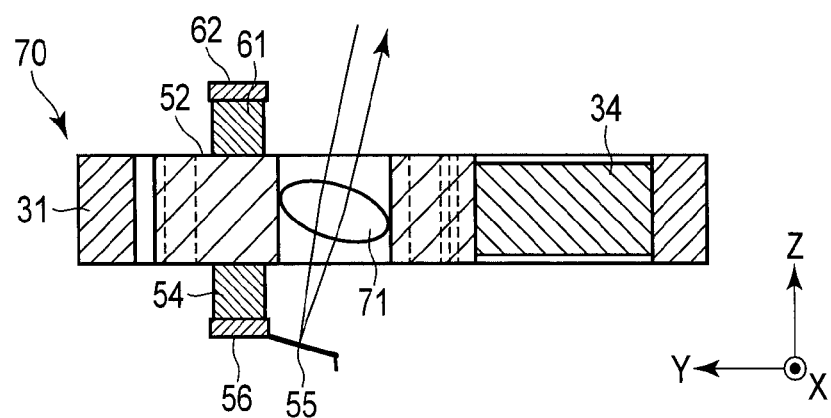
F I G. 10B

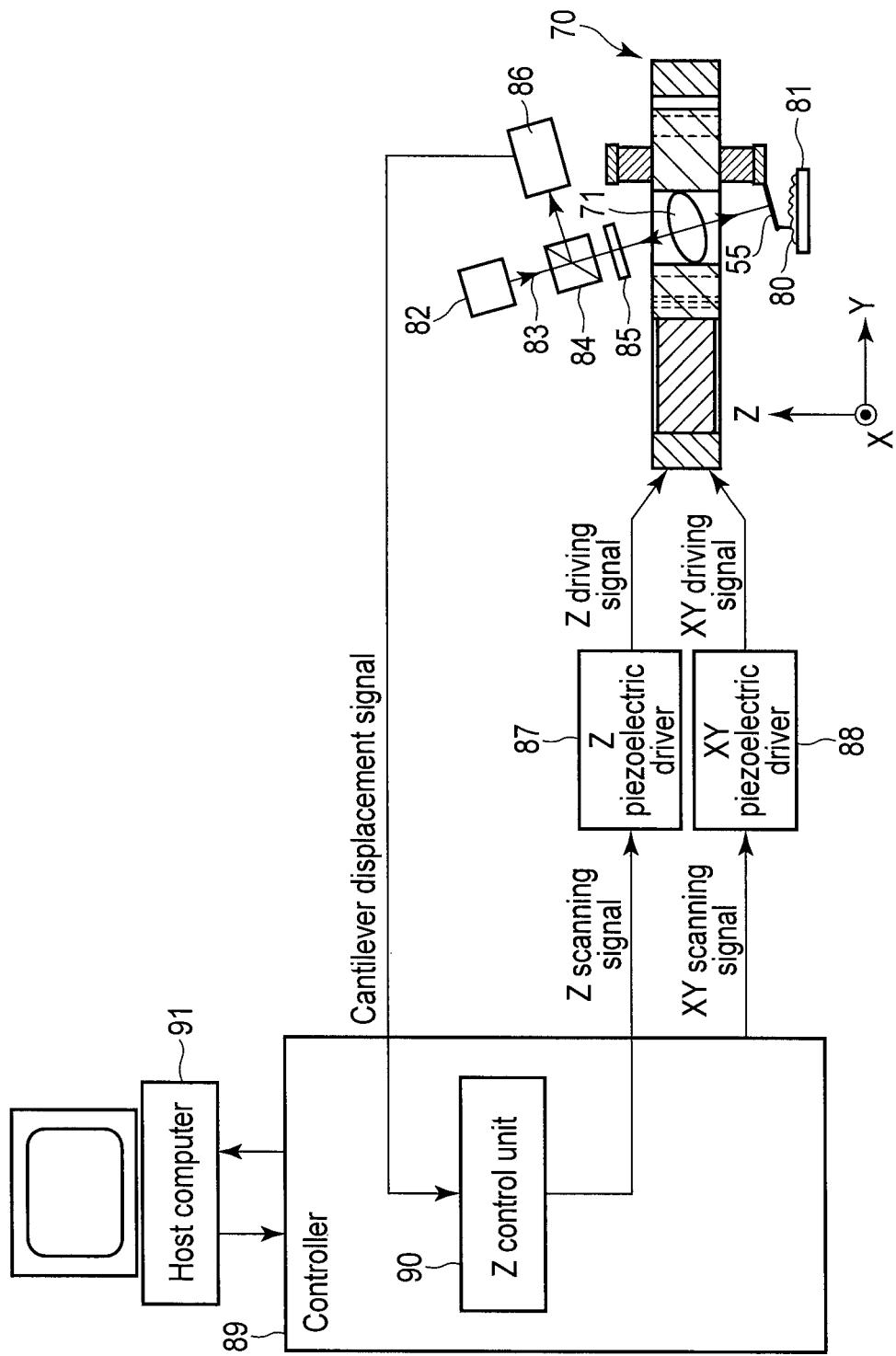
F I G. 11

SCANNING MECHANISM AND SCANNING PROBE MICROSCOPE

CROSS-REFERENCE TO RELATED APPLICATIONS

This application is a Continuation Application of PCT Application No. PCT/JP2013/070104, filed Jul. 24, 2013 and based upon and claiming the benefit of priority from Japanese Patent Application No. 2012-176243, filed Aug. 8, 2012, the entire contents of all of which are incorporated herein by reference.

BACKGROUND OF THE INVENTION

1. Field of the Invention

The present invention relates to a scanning probe microscope.

2. Description of the Related Art

A scanning probe microscope (SPM) is a scanning microscope that mechanically scans a mechanical probe by a scanning mechanism to obtain information of a sample surface. The scanning probe microscope is a generic term for a scanning tunneling microscope (STM), an atomic force microscope (AFM), a scanning magnetic force microscope (MFM), a scanning near field optical microscope (SNOM), and the like. The scanning probe microscope raster scans the mechanical probe and a sample relatively in the X and Y directions to obtain surface information of a desired sample region through the mechanical probe, and map and display it on a monitor TV.

Above all, the AFM is a most popular apparatus, and includes, as main machine mechanisms, a cantilever having a mechanical probe at its free end, an optical displacement sensor to detect the displacement of the cantilever, and a scanning mechanism to relatively scan the mechanical probe and a sample. As the optical displacement sensor, an optical lever type optical displacement sensor is employed most widely because of its simple arrangement and high displacement detection sensitivity. The optical lever type optical displacement sensor applies a beam having a diameter of several μm to several ten μm to a cantilever. A change in the reflection direction of the reflected beam depending on the warp of the lever is detected by a two-segments detector or the like. The operation of the mechanical probe at the free end of the cantilever is detected and output as an electrical signal. While the scanning mechanism is controlled in the Z direction to keep this output constant, the scanning mechanism is similarly scanned in the X and Y directions to map and display the uneven state of a sample surface on the monitor of a computer.

When observing a biological sample in a liquid, the AFM is generally combined with an inverted optical microscope. This is because the inverted optical microscope observation is effective not only when obtaining the finding of a sample, but also when positioning the cantilever at a specific portion of the sample. The AFM often uses a lever scan type scanning mechanism to scan the cantilever in the X, Y, and Z directions so as to cope with various biological samples and sample substrates.

When observing the motion of a biological sample, the observation speed is important in the AFM. For this application, the goal is to obtain one frame within 1 sec, and desirably within 0.1 sec. To increase the speed of the AFM, the machine mechanism is challenging because the electrical circuit of the AFM has already reached a possible level even in an apparatus commercially available at present. Such machine mechanisms are particularly a scanning mechanism having a high scanning speed, a flexible cantilever having a high resonance frequency, and an optical lever type optical displacement sensor capable of detecting the displacement of the cantilever.

For example, when the X direction is the direction of high-speed scanning, the Y direction is the direction of low-speed scanning, and an image of 100 pixels in the X direction and 100 pixels the Y direction is captured in 0.1 sec, the scanning frequencies in the X, Y, and Z directions that are requested of the scanning mechanism reach 1 kHz, 10 Hz, and 100 kHz or more, respectively.

The high-frequency cantilever suited to observe a biological sample requires a spring constant of 1 N/m or less and a resonance frequency of 300 kHz or more. The dimensions of such a cantilever are as small as approximately 1/10 of the dimensions of a cantilever commercially available at present. For example, a cantilever made of silicon nitride has a length of 10 μm, a width of 2 μm, and a thickness of 0.1 μm. The spring constant is 0.1 N/m, the resonance frequency in air is 1.2 MHz, and the resonance frequency in a liquid is approximately 400 kHz.

Further, the optical displacement sensor requires a light converging optical system to change the spot diameter of convergent light to be equal to or smaller than several μm in order to detect the displacement of a very small cantilever.

As described above, it is desirable that high-speed observation of a biological sample by the AFM can be combined with inverted optical microscope observation, that is, the AFM is of the lever scan type. It is necessary that the AFM can use a flexible cantilever having a high resonance frequency, and includes a scanning mechanism to allow high-speed scanning.

BRIEF SUMMARY OF THE INVENTION

The present invention is directed to a scanning mechanism to scan a scanning target object at high speed in an X direction and at low speed in a Y direction perpendicular to the X direction. The scanning mechanism includes a movable portion to which a scanning target object is attached, and an X-Y actuator to scan the movable portion in the X direction and the Y direction. The X-Y actuator is symmetrical with respect to a straight line parallel to the Y direction and asymmetrical with respect to a straight line parallel to the X direction.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5A is a plan view showing a scanning mechanism according to a modification of the second embodiment.

FIG. 5B is a sectional view showing the scanning mechanism taken along a line IIIx-IIIx in FIG. 5A.

FIG. 5C is a sectional view showing the scanning mechanism taken along a line IIIy-IIIy in FIG. 5A.

FIG. 6A is a plan view showing a scanning mechanism according to the third embodiment.

FIG. 6B is a sectional view showing the scanning mechanism taken along a line IVy-IVy in FIG. 6A.

FIG. 7A is a perspective view showing a cantilever shown in FIG. 6B.

FIG. 10A is a plan view showing a scanning mechanism according to the second modification of the third embodiment.

FIG. 10B is a sectional view showing the scanning mechanism taken along a line VIy-VIy in FIG. 10A.

FIG. 11 shows a scanning probe microscope including the scanning mechanism according to the third embodiment.

DETAILED DESCRIPTION OF THE INVENTION

Embodiments of the present invention will now be described with reference to the accompanying drawings. In all the embodiments, an XYZ orthogonal coordinate system is set so that the X-axis is parallel to the direction of high-speed scanning in raster scanning, and the Y-axis is parallel to the direction of low-speed scanning in raster scanning. That is, the direction of high-speed scanning in raster scanning is defined as the X direction, and the direction of low-speed scanning is defined as the Y direction.

First Embodiment

Figure 1A:
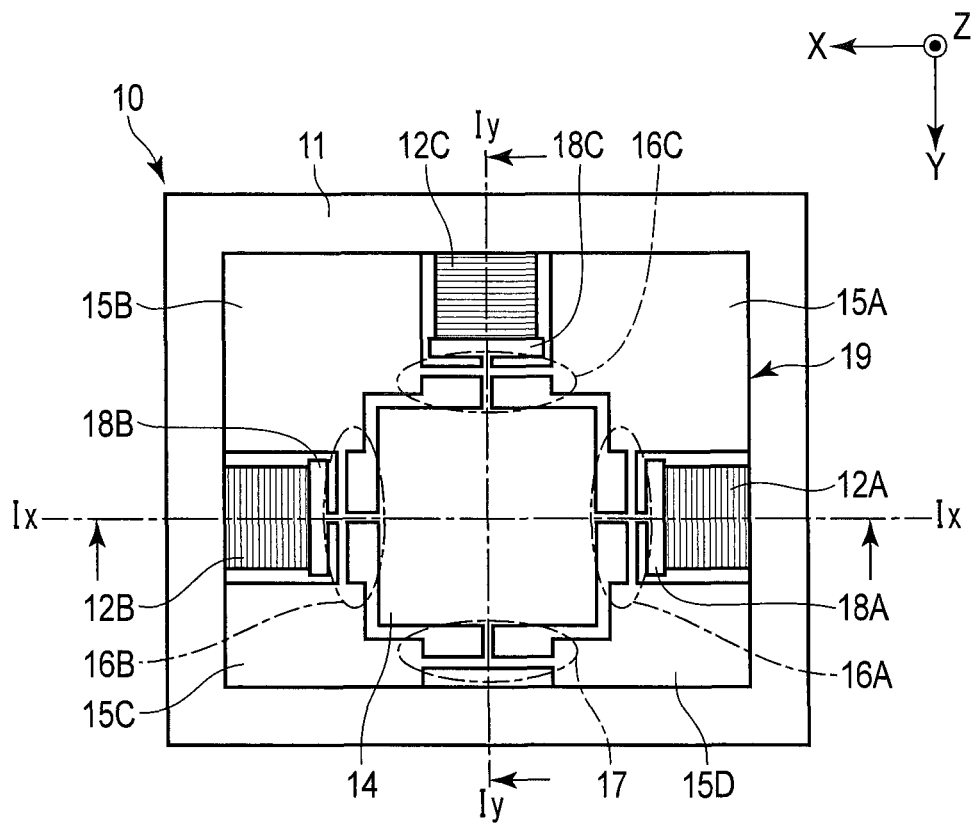
FIG. 1A is a plan view showing a scanning mechanism according to the first embodiment.
Figure 1B:
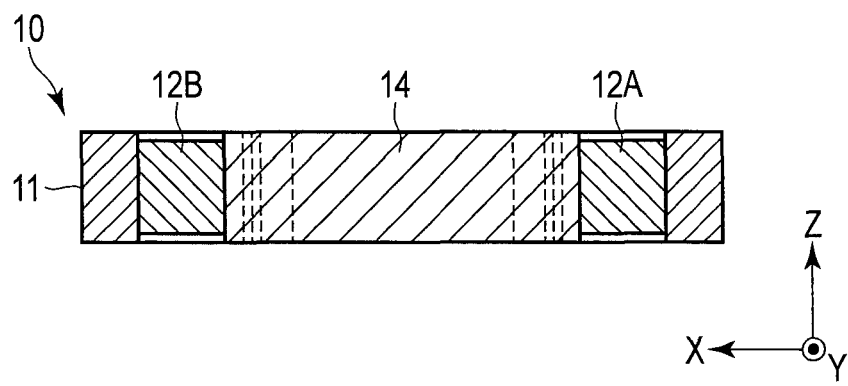
FIG. 1B is a sectional view showing the scanning mechanism taken along a line Ix-Ix in FIG. 1A.
Figure 1C:
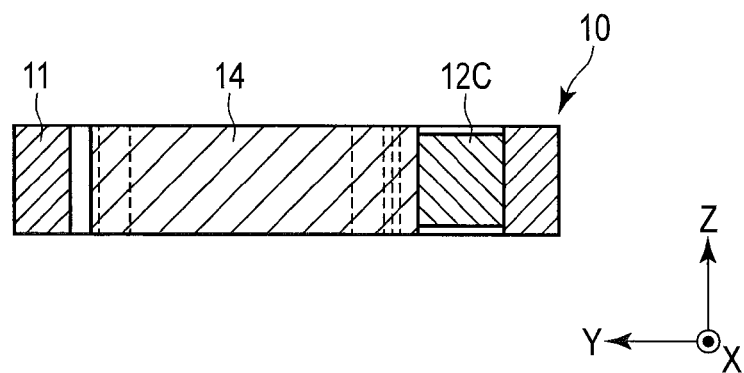
FIG. 1C is a sectional view showing the scanning mechanism taken along a line Iy-Iy in FIG. 1A.

The first embodiment is directed to a scanning mechanism. The first embodiment will be described with reference to FIGS. 1A, 1B, 1C, 2, and 3. FIG. 1A is a plan view showing the scanning mechanism according to the first embodiment. FIG. 1B is a sectional view showing the scanning mechanism taken along a line Ix-Ix in FIG. 1A. FIG. 10 is a sectional view showing the scanning mechanism taken along a line Iy-Iy in FIG. 1A.

As shown in FIGS. 1A, 1B, and 10, a scanning mechanism 10 according to the first embodiment includes a fixed frame 11, an X-Y stage 19 arranged within the fixed frame 11, a piezoelectric element 12A arranged between the X-Y stage 19 and the fixed frame 11 and extending along the X-axis, a piezoelectric element 12B arranged between the X-Y stage 19 and the fixed frame 11 so as to face the piezoelectric element 12A and extending along the X-axis, and a piezoelectric element 12C arranged between the X-Y stage 19 and the fixed frame 11 and extending along the Y-axis.

The X-Y stage 19 includes an X-Y movable portion 14 movable along the X direction and Y direction perpendicular to each other, elastic portions 16A and 16B provided on both sides of the X-Y movable portion 14 along the X-axis, elastic portions 16C and 17 provided on both sides of the X-Y movable portion 14 along the Y-axis, and support portions 15A, 15B, 15C, and 15D supporting the elastic portions 16A to 16C and 17. A scanning target object (not shown) is attached to the X-Y movable portion 14.

The piezoelectric elements 12A and 12B are arranged between the fixed frame 11 and the X-Y movable portion 14 along the X-axis. The piezoelectric elements 12A and 12B are arranged on both sides of the X-Y movable portion 14 along the X-axis. Further, the piezoelectric elements 12A and 12B are arranged so that a straight line passing through the center of gravity of the X-Y movable portion 14 and parallel to the X-axis passes through the centers of the piezoelectric elements 12A and 12B. That is, the arrangement of the piezoelectric elements 12A and 12B is symmetrical with respect to a straight line passing through the center of gravity of the X-Y movable portion 14 and parallel to the Y-axis. In other words, the arrangement of the piezoelectric elements 12A and 12B is symmetrical (axisymmetrical) along the X-axis with respect to, as the axis of symmetry, a straight line passing through the center of gravity of the X-Y movable portion 14 and parallel to the Y-axis. Although the straight line passing through the center of gravity of the X-Y movable portion 14 and parallel to the Y-axis is defined as the axis of symmetry in the first embodiment, an axis of symmetry passing through the center of the X-Y movable portion 14 is also available. That is, the form is arbitrary as long as there is, as the axis of symmetry, a straight line parallel to the Y-axis direction with respect to which the arrangement of the piezoelectric elements 12A and 12B is axisymmetrical along the X-axis.

The piezoelectric element 12C is arranged between the fixed frame 11 and the X-Y movable portion 14 along the Y-axis. The piezoelectric element 12C is positioned on one side of the X-Y movable portion 14 along the Y-axis. Further, the piezoelectric element 12C is arranged so that a straight line passing through the center of gravity of the X-Y movable portion 14 and parallel to the Y-axis passes through the center of the piezoelectric element 12C. That is, the arrangement of the piezoelectric element 12C is asymmetrical with respect to a straight line passing through the center of gravity of the X-Y movable portion 14 and parallel to the X-axis. Although the arrangement of the piezoelectric element 12C is asymmetrical with respect to the straight line passing through the center of gravity of the X-Y movable portion 14 and parallel to the X-axis in the first embodiment, it may be asymmetrical with respect to a straight line passing through the center of the X-Y movable portion 14 and parallel to the X-axis.

The elastic portion 16A is arranged between the X-Y movable portion 14 and the piezoelectric element 12A. The elastic portion 16B is arranged between the X-Y movable portion 14 and the piezoelectric element 12B. The elastic portion 16C is arranged between the X-Y movable portion 14 and the piezoelectric element 12C. The elastic portion 17 is arranged between the X-Y movable portion 14 and the fixed frame 11.

The support portions 15A and 15D are positioned on both sides of the piezoelectric element 12A along the Y-axis, and the support portions 15B and 15C are positioned on both sides of the piezoelectric element 12B along the Y-axis. The support portion 15A supports the elastic portions 16A and 16C, the support portion 15B supports the elastic portions 16B and 16C, the support portion 15C supports the elastic portions 16B and 17, and the support portion 15D supports the elastic portions 16A and 17. All the support portions 15A to 15D are fixed to the fixed frame 11. The fixation of the support portions 15A to 15D is performed by, but not limited to, e.g., screwing or bonding.

The elastic portions 16A, 16B, and 16C have completely the same shape except that their orientations are different. All the elastic portions 16A, 16B, and 16C have a cross shape. The elastic portion 17 has a T shape. The elastic portion 16A, which is positioned on the piezoelectric element 12A side of the X-Y movable portion 14, has a press portion 18A to be pressed by the piezoelectric element 12A. The elastic portion 16B, which is positioned on the piezoelectric element 12B side of the X-Y movable portion 14, has a press portion 18B to be pressed by the piezoelectric element 12B. The elastic portion 16C, which is positioned on the piezoelectric element 120 side of the X-Y movable portion 14, has a press portion 18C to be pressed by the piezoelectric element 12C.

Each of the elastic portions 16A and 16B has a rectangular plate-like portion spreading on the Z-X plane and elongated along the X-axis, and a rectangular plate-like portion spreading on the Y-Z plane and elongated along the Y-axis. The rectangular plate-like portion elongated along the X-axis has an end portion along the X-axis that is connected to the X-Y movable portion 14, and another end portion along the X-axis that is connected to the center portion of the rectangular plate-like portion elongated along the Y-axis. The rectangular plate-like portion elongated along the Y-axis has two end portions along the Y-axis that are connected to corresponding ones of the support portions 15A to 15D.

Each of the elastic portions 16C and 17 has a rectangular plate-like portion spreading on the Y-Z plane and elongated along the Y-axis, and a rectangular plate-like portion spreading on the Z-X plane and elongated along the X-axis. The rectangular plate-like portion elongated along the Y-axis has an end portion along the Y-axis that is connected to the X-Y movable portion 14, and another end portion along the Y-axis that is connected to the center portion of the rectangular plate-like portion elongated along the X-axis. The rectangular plate-like portion elongated along the X-axis has two end portions along the X-axis that are connected to corresponding ones of the support portions 15A to 15D.

The thickness of these plate-like portions, that is, the dimension along the Z-axis is equal to, but not limited to, e.g., the thickness of the X-Y movable portion 14.

With this shape, of the elastic portions 16A and 16B, both the rectangular plate-like portions spreading on the Z-X plane and elongated along the X-axis, and the rectangular plate-like portions spreading on the Y-Z plane and elongated along the Y-axis are readily elastically deformed with respect to a motion of the X-Y movable portion 14 along the Y-axis. That is, the elastic portions 16A and 16B are flexible with respect to a motion of the X-Y movable portion 14 along the Y-axis. With respect to a motion of the X-Y movable portion 14 along the X-axis, the rectangular plate-like portions spreading on the Y-Z plane and elongated along the Y-axis are readily elastically deformed, but the rectangular plate-like portions spreading on the Z-X plane and elongated along the X-axis are hardly elastically deformed. That is, the elastic portions 16A and 163 are rigid with respect to a motion of the X-Y movable portion 14 along the X-axis.

Of the elastic portions 16C and 17, both the rectangular plate-like portions spreading on the Y-Z plane and elongated along the Y-axis, and the rectangular plate-like portions spreading on the Z-X plane and elongated along the X-axis are readily elastically deformed with respect to a motion of the X-Y movable portion 14 along the X-axis. That is, the elastic portions 16C and 17 are flexible with respect to a motion of the X-Y movable portion 14 along the X-axis. With respect to a motion of the X-Y movable portion 14 along the Y-axis, the rectangular plate-like portions spreading on the Z-X plane and elongated along the X-axis are readily elastically deformed, but the rectangular plate-like portions spreading on the Y-Z plane and elongated along the Y-axis are hardly elastically deformed. That is, the elastic portions 160 and 17 are rigid with respect to a motion of the X-Y movable portion 14 along the Y-axis.

The X-Y movable portion 14 is supported by the elastic portions 16A and 16B with high rigidity in a direction along the X-axis, and by the elastic portions 16C and 17 with high rigidity in a direction along the Y-axis.

The X-Y stage 19 is formed integrally. That is, the X-Y movable portion 14, support portions 15A to 15D, elastic portions 16A to 16C, elastic portion 17, and press portions 18A to 18C are formed integrally. The X-Y stage 19 is fabricated, e.g., by selectively notching a metal block made of aluminum.

The material of the fixed frame 11 preferably has a higher elastic modulus than that of the material of the X-Y stage 19. For example, the fixed frame 11 is made of stainless steel, and the X-Y stage 19 is made of aluminum.

The piezoelectric element 12A is so arranged as to apply a predetermined preload between the press portion 18A of the elastic portion 16A and the fixed frame 11. The piezoelectric element 12B is so arranged as to apply a predetermined preload between the press portion 18B of the elastic portion 16B and the fixed frame 11. The piezoelectric element 12C is so arranged as to apply a predetermined preload between the press portion 18C of the elastic portion 16C and the fixed frame 11.

The piezoelectric element 12A, which is a first X actuator for scanning the X-Y movable portion 14 through the elastic portion 16A in the X direction, is capable of expanding and contracting along the X-axis in accordance with application of a voltage. The piezoelectric element 12B, which is a second X actuator for scanning the X-Y movable portion 14 through the elastic portion 16B in the X direction, is capable of expanding and contracting along the X-axis in accordance with application of a voltage. The piezoelectric element 12C, which is a Y actuator for scanning the X-Y movable portion 14 through the elastic portion 16C in the Y direction, is capable of expanding and contracting along the Y-axis in accordance with application of a voltage.

The piezoelectric elements 12A, 12B, and 12C are constituted by, e.g., substantially identical multilayer piezoelectric elements. "Substantially identical" means a difference of 30% or less in shape or characteristic. This is because the piezoelectric element itself already has nonlinearity of approximately 30%. If variations are 30% or less, piezoelectric elements can be regarded as substantially identical ones.

The piezoelectric elements 12A and 12B are configured to perform a push-pull operation. The piezoelectric element 12B contracts when the piezoelectric element 12A expands, and expands when the piezoelectric element 12A contracts. That is, the piezoelectric elements 12A and 12B operate oppositely in the expansion/contraction operation.

Figure 2:
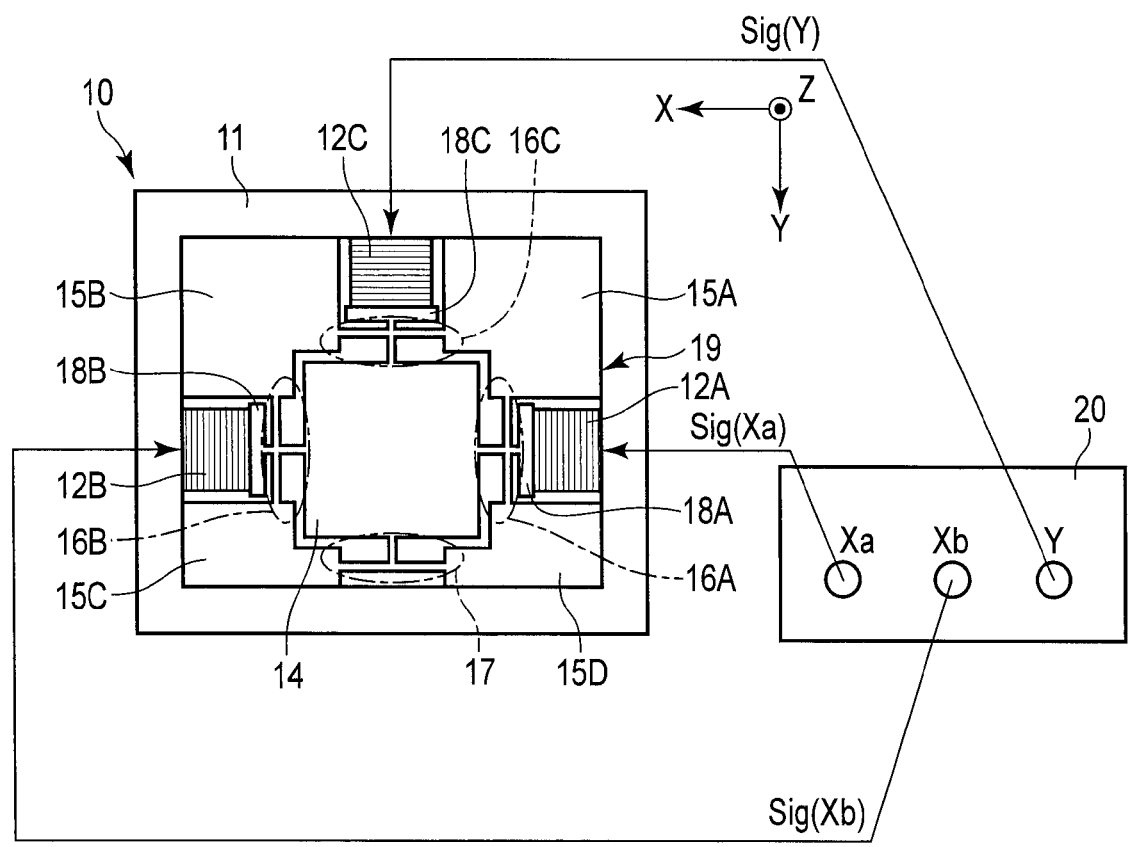
FIG. 2 shows an X-Y piezo driver for driving a piezoelectric element mounted in the scanning mechanism in FIGS. 1A, 1B, and 10.
Figure 3:
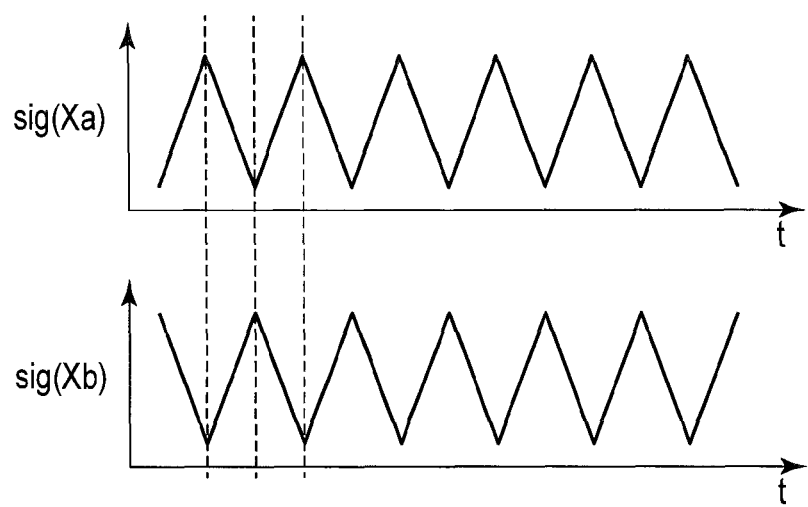
FIG. 3 shows signals output from the X-Y piezo driver in FIG. 2.

FIG. 2 shows an X-Y piezo driver 20 for causing the expansion/contraction operation of the piezoelectric elements 12A to 12C. The X-Y piezo driver 20 has output terminals of three channels and can apply a voltage to the piezoelectric elements 12A to 12C. Driving signals Sig(Xa), Sig(Xb), and Sig (Y) for applying a voltage to the piezoelectric elements 12A to 12C are output from output terminal Xa, Xb, and Y, respectively. FIG. 3 shows signals output from the X-Y piezo driver 20. As shown in FIG. 3, the driving signal Sig(Xa) to the piezoelectric element 12A and the driving signal Sig(Xb) to the piezoelectric element 12B have opposite phases. Thus, the piezoelectric element 12B contracts when the piezoelectric element 12A expands, and expands when the piezoelectric element 12A contracts.

As described above, the piezoelectric elements 12A, 12B, and 12C constitute an X-Y actuator to scan the X-Y movable portion 14 in the X direction and Y direction. As described above, the arrangement of the piezoelectric elements 12A and 12B is symmetrical with respect to a straight line passing through the center of gravity of the X-Y movable portion 14 and parallel to the Y-axis. The arrangement of the piezoelectric element 12C is asymmetrical with respect to a straight line passing through the center of gravity of the X-Y movable portion 14 and parallel to the X-axis. That is, this X-Y actuator is symmetrical with respect to the straight line passing through the center of gravity of the X-Y movable portion 14 and parallel to the Y direction, and asymmetrical with respect to the straight line passing through the center of gravity of the X-Y movable portion 14 and parallel to the X direction.

In the scanning mechanism 10 having this arrangement, the piezoelectric elements 12A and 12B expand and contract along the X-axis at the time of X scanning. When the piezoelectric element 12A expands, the piezoelectric element 12A pushes the X-Y movable portion 14 in the plus direction along the X-axis while elastically deforming the elastic portion 16A. At the same time, the piezoelectric element 12B contracts, and pulls the X-Y movable portion 14 in the plus direction along the X-axis while elastically deforming the elastic portion 16B. Therefore, the X-Y movable portion 14 is moved in the plus direction along the X-axis. Along with this, even the elastic portions 16C and 17 are pulled in the moving direction of the X-Y movable portion 14 and elastically deformed. At this time, the elastic deformation amounts of the elastic portions 16A and 16B are almost equal. The elastic deformation amounts of the elastic portions 16C and 17 are also almost equal.

To the contrary, when the piezoelectric element 12A contracts, the piezoelectric element 12A pulls the X-Y movable portion 14 in the minus direction along the X-axis while elastically deforming the elastic portion 16A. At the same time, the piezoelectric element 12B expands, and pushes the X-Y movable portion 14 in the minus direction along the X-axis while elastically deforming the elastic portion 16B. Accordingly, the X-Y movable portion 14 is moved in the minus direction along the X-axis. Along with this, even the elastic portions 16C and 17 are pulled in the moving direction of the X-Y movable portion 14 and elastically deformed. At this time, the elastic deformation amounts of the elastic portions 16A and 16B are almost equal. The elastic deformation amounts of the elastic portions 16C and 17 are also almost equal.

In this scanning of the X-Y movable portion 14 along the X-axis, the elastic deformation amounts of the elastic portions 16C and 17 are almost equal, so forces applied to the X-Y movable portion 14 in the Y direction are balanced. The X-Y movable portion 14 is therefore scanned with very high rectilinear propagation in the X direction without pulling the X-Y movable portion 14 in either direction along the Y-axis.

Further, since the piezoelectric element 12B contracts when the piezoelectric element 12A expands, and expands when the piezoelectric element 12A contracts, that is, the push-pull operation is performed, a load in the X direction that is applied near the center of gravity of the X-Y movable portion 14 at the time of X scanning theoretically is approximately 0 (ZERO). Generally, a scanning mechanism capable of high-speed raster scanning is designed to have high rigidity in order to increase the resonance frequency of the overall scanning mechanism. The frequency in high-speed scanning reaches 1 kHz or higher. In this scanning mechanism, an impact load applied to the movable portion at the time of X scanning is very large. This causes a problem that the natural vibrations of the movable portion and scanning mechanism are excited to increase vibration noise. The push-pull operation in the X direction substantially cancels the load in the X direction that is applied near the center of gravity of the X-Y movable portion 14, so this problem is avoided. That is, this push-pull operation is effective in vibration noise reduction.

At the time of Y scanning, the piezoelectric element 12C expands or contracts along the Y-axis. When the piezoelectric element 12C expands, the piezoelectric element 12C pushes the X-Y movable portion 14 while elastically deforming the elastic portion 16C. The X-Y movable portion 14 is thus moved in the plus direction along the Y-axis. Along with this, the elastic portion 17 is pushed to the X-Y movable portion 14 and elastically deformed. Further, even the elastic portions 16A and 16B are pulled in the moving direction of the X-Y movable portion 14 and elastically deformed. At this time, the elastic deformation amounts of the elastic portions 16A and 16B are almost equal. The elastic deformation amounts of the elastic portions 16C and 17 are also almost equal.

When the piezoelectric element 12C contracts, the piezoelectric element 12C pulls the X-Y movable portion 14 in the minus direction along the Y-axis while elastically deforming the elastic portion 16C. Hence, the X-Y movable portion 14 is moved in the minus direction along the Y-axis. Along with this, the elastic portion 17 is pulled to the X-Y movable portion 14 and elastically deformed. Further, even the elastic portions 16A and 16B are pulled in the moving direction of the X-Y movable portion 14 and elastically deformed. At this time, the elastic deformation amounts of the elastic portions 16A and 16B are almost equal. The elastic deformation amounts of the elastic portions 16C and 17 are also almost equal.

In this scanning of the X-Y movable portion 14 along the Y-axis, the elastic deformation amounts of the elastic portions 16A and 16B is almost equal, so forces applied to the X-Y movable portion 14 in the X direction are balanced. As a result, the X-Y movable portion 14 is scanned with very high rectilinear propagation in the Y direction without pulling the X-Y movable portion 14 in either direction along the X-axis.

In scanning of the X-Y movable portion 14 along the Y-axis, the scanning speed is as low as ¹/₁₀₀ or less of the scanning speed in scanning along the X-axis, and the impact load is much smaller. That is, the influence of vibration noise is very small even without the push-pull operation. To perform the push-pull operation, it is necessary to increase the number of piezoelectric elements and also add a piezoelectric amplifier for one channel. This increases the number of building components, complicates the structure, and raises the cost. This problem is avoided in scanning of the X-Y movable portion 14 along the Y-axis.

As is apparent from the above description, in the scanning mechanism according to the first embodiment, the piezoelectric elements 12A and 12B constitute X actuators suited for the push-pull operation useful for high-speed scanning, and the piezoelectric element 12C constitutes a Y actuator suited for low-speed scanning that does not require the push-pull operation. More specifically, the scanning mechanism according to the first embodiment includes the X actuators suited for high-speed scanning and the Y actuator suited for low-speed scanning. Vibration noise is satisfactorily suppressed by applying the push-pull operation to only X scanning of a high scanning speed. The arrangement of the Y actuator for Y scanning of a low scanning speed is simplified. Therefore, high-precision scanning can be implemented without unnecessarily increasing the number of building components, wastefully complicating the structure, and further raising the cost.

Second Embodiment

Figure 4A:
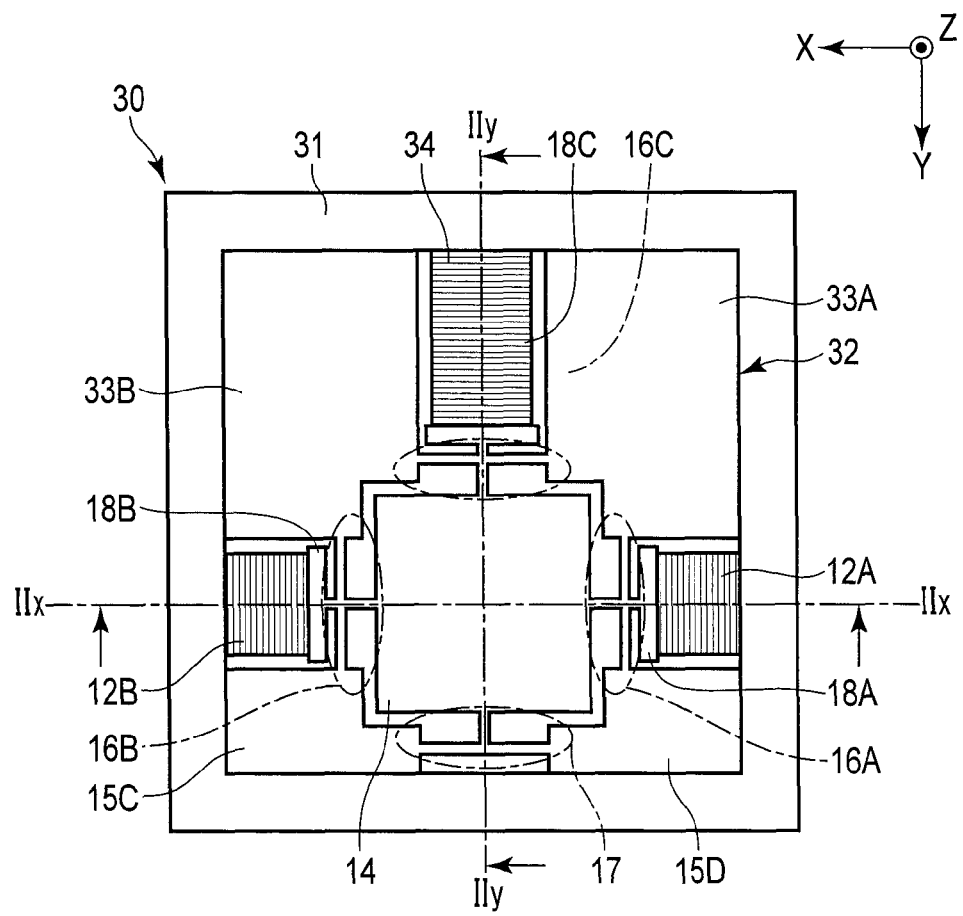
FIG. 4A is a plan view showing a scanning mechanism according to the second embodiment.
Figure 4B:
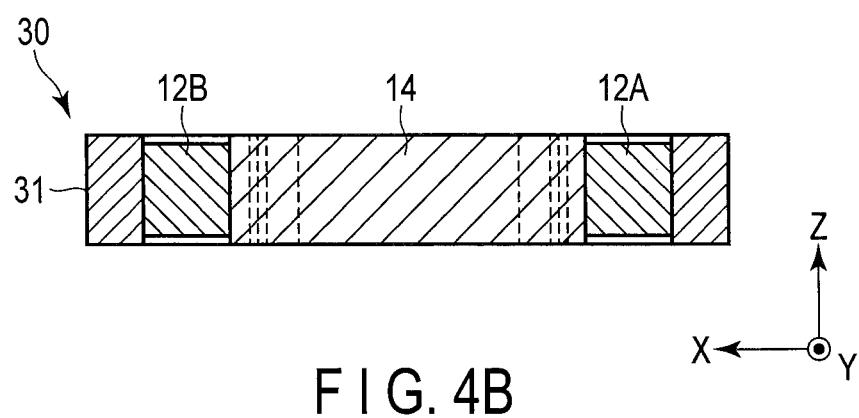
FIG. 4B is a sectional view showing the scanning mechanism taken along a line IIx-IIx in FIG. 4A.
Figure 4C:
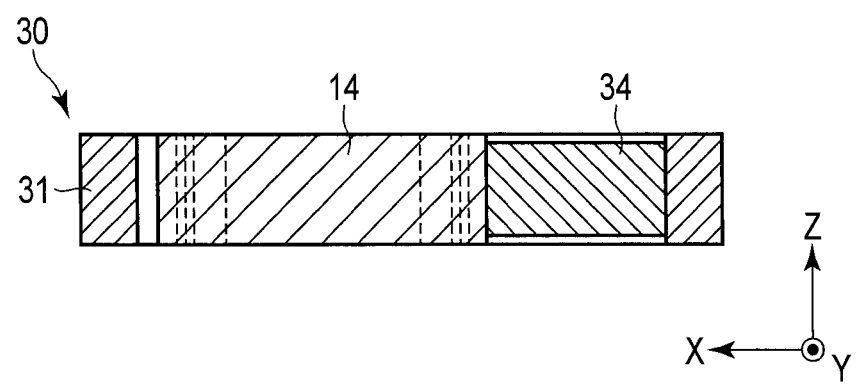
FIG. 4C is a sectional view showing the scanning mechanism taken along a line IIy-IIy in FIG. 4A.

The second embodiment is directed to a scanning mechanism. The second embodiment will be described with reference to FIGS. 4A, 4B, and 4C. FIG. 4A is a plan view showing the scanning mechanism according to the second embodiment. FIG. 4B is a sectional view showing the scanning mechanism taken along a line IIx-IIx in FIG. 4A. FIG. 4C is a sectional view showing the scanning mechanism taken along a line IIy-IIy in FIG. 4A. In FIGS. 4A, 4B, and 4C, the same reference numerals as those shown in FIGS. 1A, 1B, and 10 denote the same parts, and a detailed description thereof will not be repeated.

As shown in FIGS. 4A, 4B, and 4C, a scanning mechanism 30 according to the second embodiment is different from the scanning mechanism 10 in a fixed frame 31, an X-Y stage 32 including support portions 33A and 33B, and a piezoelectric element 34.

The piezoelectric element 34 is constituted by, e.g., a multilayer piezoelectric element and has, e.g., a double driving efficiency (displacement amount per unit driving signal), compared to the piezoelectric element 12C (or the piezoelectric element 12A or the piezoelectric element 12B) of the scanning mechanism 10 shown in FIG. 1A. That is, the piezoelectric element 34 has double the length of the piezoelectric element 12C (or the length of the piezoelectric element 12A or the length of the piezoelectric element 12B). Along with this, the fixed frame 31, and the X-Y stage 32 including the support portions 33A and 33B have shapes spreading along the Y-axis by the length of the piezoelectric element 34.

The push-pull operation in X scanning has an effect capable of substantially eliminating a load along the X-axis that is applied near the center of gravity of an X-Y movable portion 14. As a result, the deformation of the X-Y movable portion 14 arising from an impact load at the time of X scanning is not generated. However, since no push-pull operation is performed in scanning along the Y-axis, a force regarded as a static load is applied to the X-Y movable portion 14 and may deform the X-Y movable portion 14. The deformation of the X-Y movable portion 14 means absorbing the displacement of the piezoelectric element 34. That is, the displacement amount is smaller in a direction along the Y-axis than in a direction along the X-axis. To increase the displacement amount in the direction along the Y-axis, the rigidity may be decreased only in the direction along the Y-axis of the scanning mechanism, but this may decrease the rigidity of the overall scanning mechanism.

The scanning mechanism according to the second embodiment solves this problem. As a piezoelectric element in the direction along the Y-axis, a piezoelectric element longer (higher in driving efficiency) than a piezoelectric element in the direction along the X-axis, for example, a piezoelectric element having a double length is used. Accordingly, the displacement amount in the direction along the Y-axis can be increased while substantially maintaining the rigidity of the overall scanning mechanism.

In the scanning mechanism according to the second embodiment, for example, a piezoelectric element having a double length is used as the piezoelectric element in the direction along the Y-axis. However, since the decrease amount of a displacement in the direction along the Y-axis changes depending on the structures of the movable portion and scanning mechanism (structure of the elastic portion), in practice, the length needs to be selected so that a displacement in the direction along the Y-axis becomes equal to a displacement in the direction along the X-axis.

MODIFICATION

Further, the following modification is possible in this scanning mechanism. FIGS. 5A, 5B, and 5C show a scanning mechanism 40 as a modification of the second embodiment. FIG. 5A is a plan view showing the scanning mechanism according to this modification. FIG. 5B is a sectional view showing the scanning mechanism taken along a line IIIx-IIIx in FIG. 5A. FIG. 5C is a sectional view showing the scanning mechanism taken along a line IIIy-IIIy in FIG. 5A. In FIGS. 5A, 5B, and 5C, the same reference numerals as those shown in FIGS. 4A, 4B, and 4C denote the same parts, and a detailed description thereof will not be repeated.

As shown in FIGS. 5A, 5B, and 5C, the scanning mechanism 40 according to this modification is different from the scanning mechanism 30 in a fixed frame 41, an X-Y stage 42 including support portions 43A and 43B, piezoelectric elements 44 and 45, and an elastic member 46.

The piezoelectric elements 44 and 45 are constituted by multilayer piezoelectric elements substantially identical to the piezoelectric elements 12A and 12B. The piezoelectric elements 44 and 45 are connected in series through the elastic member 46. That is, the total value of the lengths of the piezoelectric elements 44 and 45 in the displacement direction is larger than the length of the piezoelectric element 12A or 12B in the displacement direction.

The elastic member 46 is formed from, e.g., an aluminum plate spreading in the Z-X plane, and its two ends are fixed to the support portions 43A and 43B. The fixation is performed by, e.g., press fitting, screwing, or bonding. Although not shown, the two ends of the elastic member 46 may be formed integrally with the X-Y stage 42 including the support portions 43A and 43B, or fixed directly to the fixed frame 41. The elastic member 46 may be variously modified and changed as long as it is configured to readily elastically deform along the Y-axis and hardly deform along the X- and Z-axes.

In the modification of the scanning mechanism according to the second embodiment, the same driving efficiency as that of the piezoelectric element 34 shown in FIG. 4A, i.e., double the driving efficiency of the piezoelectric element 12A or 12B is obtained by coupling the piezoelectric elements 44 and 45. As a result, the same effects as those of the scanning mechanism 30 shown in FIGS. 4A, 4B, and 4C are obtained.

Since the piezoelectric elements 44 and 45 are substantially identical to the piezoelectric elements 12A and 12B, they can be implemented using common components without increasing the number of types of building components.

Further, the coupling portion between the piezoelectric elements 44 and 45 is constrained by the elastic member 46 in two directions along the X- and Z-axes. Thus, the rigidity of the overall scanning mechanism can be increased in comparison with the scanning mechanism 30 shown in FIGS. 4A, 4B, and 4C.

In this modification, the two piezoelectric elements 44 and 45 are connected in series through the elastic member 46. However, three or more piezoelectric elements may be coupled through elastic members.

Third Embodiment

The third embodiment is directed to a scanning mechanism. The third embodiment will be described with reference to FIGS. 6A and 6B. FIG. 6A is a plan view showing the scanning mechanism according to the third embodiment. FIG. 6B is a sectional view showing the scanning mechanism taken along a line IVy-IVy in FIG. 6A. In FIGS. 6A and 6B, the same reference numerals as those shown in FIGS. 4A, 4B, and 4C denote the same parts, and a detailed description thereof will not be repeated.

As shown in FIGS. 6A and 6B, a scanning mechanism 50 according to the third embodiment is different from the scanning mechanism 30 shown in FIGS. 4A, 4B, and 4C in an X-Y stage 51 including an X-Y movable portion 52. More specifically, the X-Y movable portion 52 is constituted by adding a scanning target object to the X-Y movable portion 14 shown in FIG. 4A.

The scanning mechanism 50 includes a piezoelectric element 54 held by the X-Y movable portion 52, a holder 56 held by the piezoelectric element 54, and a cantilever 55 held by the holder 56. The piezoelectric element 54 has one end fixed to the X-Y movable portion 52, and extends in the −Z direction. The holder 56 to hold the cantilever 55 is held at the free end of the piezoelectric element 54. The piezoelectric element 54 is constituted by, e.g., a multilayer piezoelectric element. The piezoelectric element 54 is capable of expanding and contracting along the Z-axis in accordance with application of a voltage. The piezoelectric element 54 constitutes, solely or together with the holder 56, a Z actuator to scan the cantilever 55 in the Z direction perpendicular to the X-Y plane. The cantilever 55 is attached to the holder 56 so that it can be exchanged.

The holder 56 holds the cantilever 55 at an inclination of 5 degrees to 20 degrees with respect to the X-Y plane. This is practiced in almost all AFMs in order to avoid interference between the lever surface of the cantilever 55 and a sample (not shown) arranged parallel to the X-Y plane.

Figure 7B:
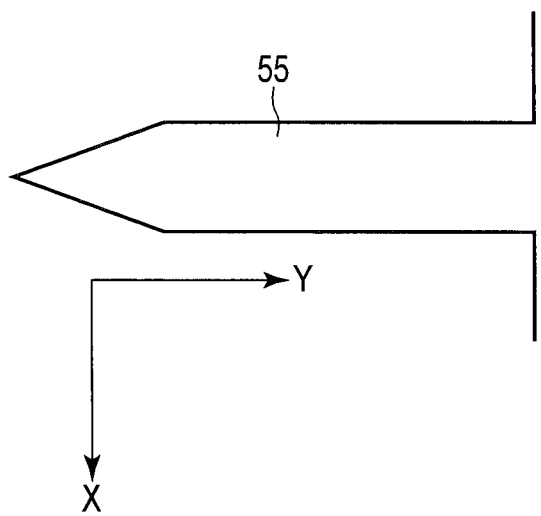
FIG. 7B is a plan view showing the cantilever shown in FIG. 6B.
Figure 7C:
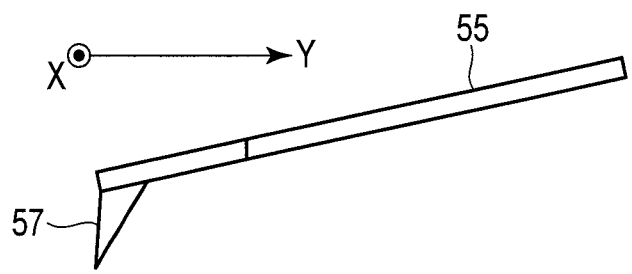
FIG. 7C is a side view showing the cantilever shown in FIG. 6B.

FIGS. 7A, 7B, and 7C are enlarged views showing the cantilever 55. FIG. 7A is a perspective view, FIG. 7B is a plan view, and FIG. 7C is a side view. As shown in FIGS. 7A, 7B, and 7C, the cantilever 55 includes a mechanical probe 57 at the free end of the cantilever 55. The cantilever 55 extends in the minus direction along the Y-axis. That is, the holder 56 holds the cantilever 55 with its longitudinal direction being along the Y-axis.

The scanning mechanism 50 further includes a light converging portion 53 held by the X-Y movable portion 52. The light converging portion 53 is arranged inside a through hole formed in the X-Y movable portion 52, and falls within the thickness of the X-Y movable portion 52. The light converging portion 53 operates so that light for detecting the displacement of the cantilever 55, which is emitted from an optical displacement sensor, e.g., an optical lever sensor, not shown, of the cantilever, enters the cantilever 55. The light converging portion 53, for example, is constituted by, but not limited to, a single lens and has an optical characteristic in which the NA (Numerical Aperture) is equal to or larger than 0.4 so that light can be converged even to a small cantilever. The diameter of the light converging portion 53 is desirably equal to or smaller than 10 mm. This is because it is important to reduce the size and weight of the X-Y movable portion 52 itself in order to increase the X-Y scanning speed.

The X-Y movable portion 52 holds the piezoelectric element 54 and light converging portion 53 so that the piezoelectric element 54 and light converging portion 53 are symmetrical with respect to a straight line passing through the center of gravity of the X-Y movable portion 52 and parallel to the Y-axis. Also, the piezoelectric element 54 and light converging portion 53 are arranged side by side along the Y-axis in projection to the X-Y plane. In other words, one of the piezoelectric element 54 and light converging portion 53 is positioned outside the other without overlapping each other on the projected X-Y plane.

In the scanning mechanism 50 having this arrangement, the X-Y movable portion 52 is scanned in the X and Y directions at high speed with high rectilinear propagation without increasing vibration noise, similarly to the effects of the scanning mechanism 30 shown in FIGS. 4A, 4B, and 4C.

When the X-Y movable portion 52 is scanned in the X and Y directions, the cantilever 55 is also scanned in the X and Y directions together with the piezoelectric element 54. The cantilever 55 is therefore scanned at high speed with high rectilinear propagation without applying vibration noise.

Figure 8A:
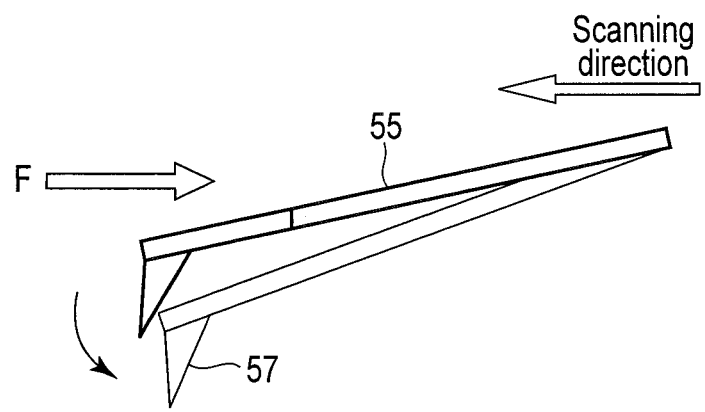
FIG. 8A shows the deformation of the cantilever generated when the cantilever in FIGS. 7A, 7B, and 7C is scanned in a longitudinal direction.
Figure 8B:
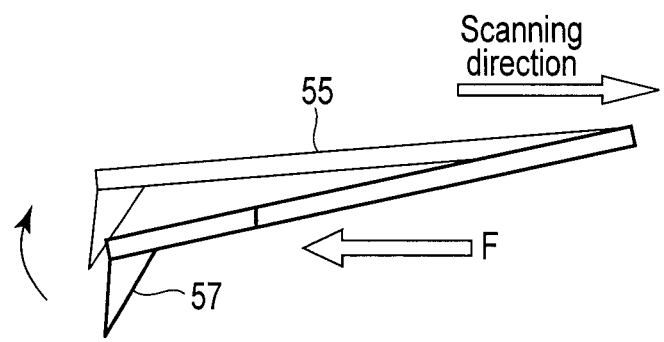
FIG. 8B shows the deformation of the cantilever generated when the cantilever in FIGS. 7A, 7B, and 7C is scanned in a longitudinal direction.

The cantilever 55 is held to extend in the minus direction along the Y-axis. As shown in FIGS. 8A and 8B, when the cantilever 55 is scanned in the longitudinal direction, the cantilever 55 warps upon receiving the resistance (F) of air or water (observation in air or liquid). This warp becomes larger as the scanning speed becomes higher because the resistance is proportional to the speed. Hence, the cantilever 55 needs to be held so that it extends along the Y-axis as the axis of low-speed scanning. Since the cantilever 55 is held to extend along the Y-axis in the scanning mechanism 50, the cantilever 55 can be scanned in the X and Y directions at high speed while hardly warping the cantilever 55.

In addition, when the X-Y movable portion 52 is scanned in the X and Y directions, the light converging portion 53 is also scanned in the X and Y directions. Even the light converging portion 53 is scanned in the X and Y directions at high speed with high rectilinear propagation without applying vibration noise.

Further, when the X-Y movable portion 52 is scanned in the X and Y directions, the focus position of the light converging portion 53 is also scanned by the same distance in the X and Y directions together with the light converging portion 53. Thus, the converged spot of a laser beam converged by the light converging portion 53 is also scanned in the X and Y directions by the same distance as that of the light converging portion 53. Thus, the converged spot of the laser beam that is formed by the light converging portion 53 is scanned in the X and Y directions at high speed with high rectilinear propagation without applying vibration noise.

Accordingly, in the scanning mechanism 50, the cantilever 55, and the converged spot of a laser beam that is formed by the light converging portion 53 are scanned by the same distance in the X and Y directions at high speed with high precision and high rectilinear propagation while hardly generating relative vibrations in the cantilever 55 and the converged spot.

In the scanning mechanism 50, the cantilever 55, and the converged spot of a laser beam that is formed by the light converging portion 53 are scanned by the same distance in the X and Y directions with high precision and high rectilinear propagation. Accordingly, there is provided a detected light follow-up type scanning mechanism that has high precision and high rectilinear propagation and is capable of high-speed raster scanning.

The scanning mechanism 50 is constituted by adding the light converging portion 53, the piezoelectric element 54, the holder 56, and the cantilever 55, which are the scanning target object, to the scanning mechanism 30 shown in FIGS. 4A, 4B, and 4C. However, the scanning mechanism 30 shown in FIGS. 4A, 4B, and 4C may be replaced with the scanning mechanism 10 shown in FIGS. 1A, 1B, and 1C or the scanning mechanism 40 shown in FIGS. 5A, 5B, and 5C.

First Modification

Figure 9A:
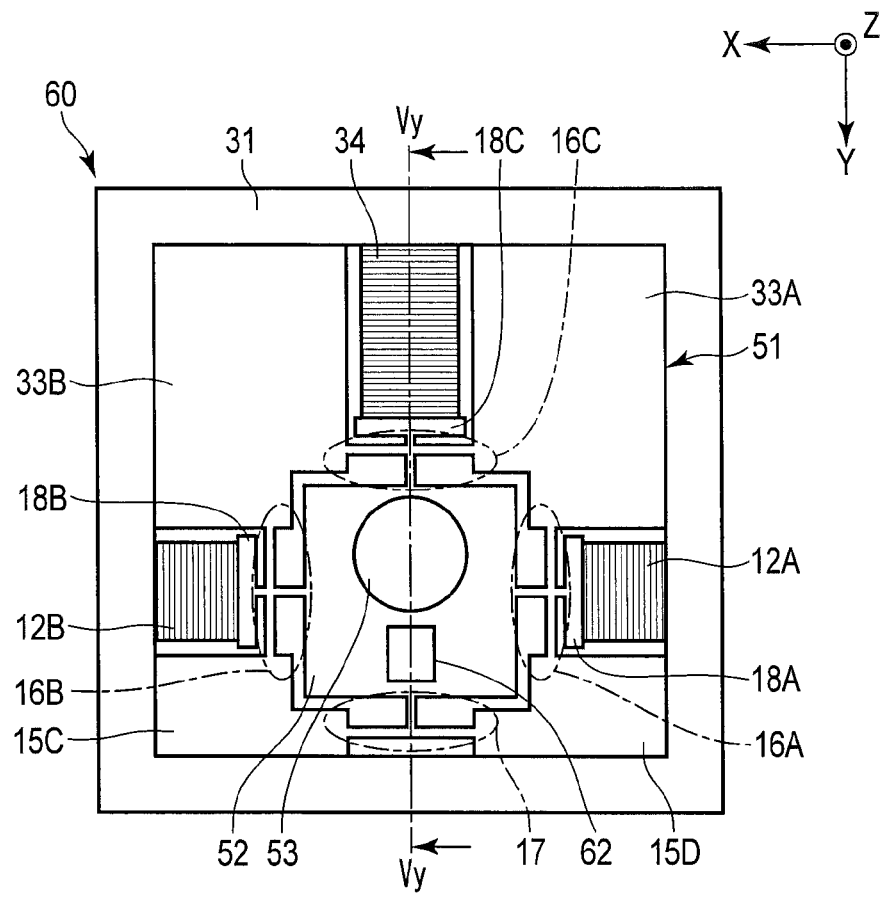
FIG. 9A is a plan view showing a scanning mechanism according to the first modification of the third embodiment.
Figure 9B:
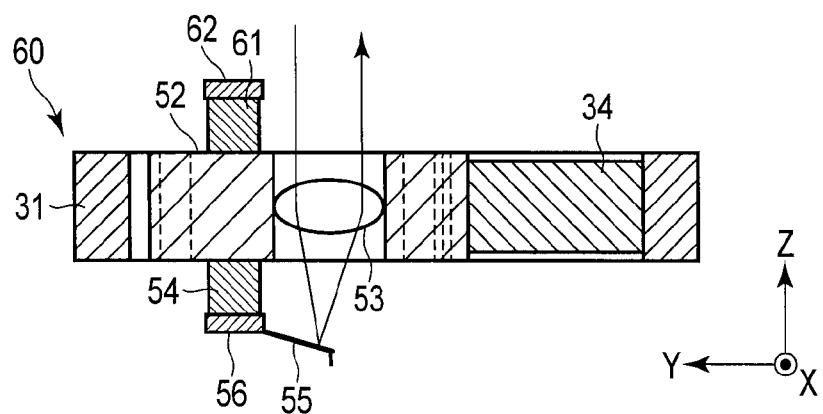
FIG. 9B is a sectional view showing the scanning mechanism taken along a line Vy-Vy in FIG. 9A.

Further, the following modification is possible in this scanning mechanism. FIGS. 9A and 9B show a scanning mechanism 60 as the first modification of the third embodiment. FIG. 9A is a plan view showing the scanning mechanism according to this modification. FIG. 9B is a sectional view showing the scanning mechanism taken along a line VIy-VIy in FIG. 9A. In FIGS. 9A and 9B, the same reference numerals as those shown in FIGS. 6A and 6B denote the same parts, and a detailed description thereof will not be repeated.

As shown in FIGS. 9A and 9B, the scanning mechanism 60 as the first modification of the third embodiment includes a piezoelectric element 61 and pseudo-holder 62, in addition to the arrangement of the scanning mechanism 50 shown in FIGS. 6A and 6B.

The piezoelectric element 61 has one end fixed to the X-Y movable portion 52, and extends in the +Z direction. That is, the piezoelectric elements 54 and 61 extend from the X-Y movable portion 52 to opposite sides along the Z-axis.

The piezoelectric elements 54 and 61 are constituted by, e.g., substantially identical multilayer piezoelectric elements, and capable of expanding and contracting along the Z-axis in accordance with application of a voltage. The piezoelectric elements 54 and 61 constitute a Z actuator to scan the cantilever 55 in the Z direction perpendicular to the X-Y plane.

The pseudo-holder 62 that is a member identical to the holder 56 is attached to the free end of the piezoelectric element 61 provided on the upper surface of the X-Y movable portion 52. The pseudo-holder 62 may be replaced with a member having the same mass as that of the holder 56.

When scanning the cantilever 55 in the Z direction, a Z driving signal is supplied from a Z piezoelectric driving unit (not shown) to the two piezoelectric elements 54 and 61 to expand/contract the two piezoelectric elements 54 and 61 by the same amount in opposite directions. The expansion/contraction of the piezoelectric element 61 cancels a force along the Z-axis that is applied to the X-Y movable portion 52 by the expansion/contraction of the piezoelectric element 54. Accordingly, vibrations of the X-Y movable portion 52 in the Z direction that are generated by the expansion/contraction of the piezoelectric element 54 are suppressed to be approximately 0 (ZERO).

In the scanning mechanism 60 having this arrangement, even vibration noise generated when the cantilever 55 is scanned in the Z direction is suppressed to be approximately 0 (ZERO) by the Z actuator constituted by the two piezoelectric elements 54 and 61, in addition to the effects of the scanning mechanism 50 shown in FIGS. 6A and 6B.

Second Modification

Further, the following modification is possible in this scanning mechanism. FIGS. 10A and 10B show a scanning mechanism 70 as the second modification of the third embodiment. FIG. 10A is a plan view showing the scanning mechanism according to this modification. FIG. 10B is a sectional view showing the scanning mechanism taken along a line VIy-VIy in FIG. 10A. In FIGS. 10A and 10B, the same reference numerals as those shown in FIGS. 9A and 9B denote the same parts, and a detailed description thereof will not be repeated.

As shown in FIGS. 10A and 10B, the scanning mechanism 70 as the second modification of the third embodiment is constituted by replacing the light converging portion 53 shown in FIGS. 9A and 9B with a single lens 71, unlike the scanning mechanism 60 shown in FIGS. 9A and 9B.

The single lens 71 is held so that its optical axis is inclined at an angle of 5 degrees to 20 degrees with respect to an axis perpendicular to the X-Y plane to cause convergent light to perpendicularly enter the lever surface of the cantilever 55. The single lens 71 is arranged inside a through hole formed in the X-Y movable portion 52, and falls within the thickness of the X-Y movable portion 52. The single lens 71 has an optical characteristic in which the NA (Numerical Aperture) is equal to or larger than 0.4 so that light can be converged even to a small cantilever 10 μm long and 2 μm wide.

In the scanning mechanism 70 having this arrangement, the following effects are obtained in addition to the effects of the scanning mechanism 60 shown in FIGS. 9A and 9B.

Since the single lens 71 is held so that its optical axis is inclined at an angle of 5 degrees to 20 degrees with respect to an axis perpendicular to the X-Y plane, convergent light can perpendicularly enter the cantilever 55. The single lens 71 has an optical characteristic in which the NA (Numerical Aperture) is equal to or larger than 0.4. As a result, the diameter of a converged spot formed on the cantilever 55 can be decreased to approximately 2 μm. This is effective for improving the detection precision of displacement of the cantilever 55.

Fourth Embodiment

The fourth embodiment is directed to a scanning probe microscope including the scanning mechanism according to the third embodiment. The fourth embodiment will be explained with reference to FIG. 11.

As shown in FIG. 11, the scanning probe microscope according to the fourth embodiment includes a scanning mechanism 70 holding a cantilever 55, a host computer 91, a controller 89 including a Z control unit 90, a Z piezo driver 87, an X-Y piezo driver 88, a laser source 82, a beam splitter 84, a wave plate 85, and a multi-segments detector 86. A sample 80 set on a sample mount 81 is arranged at a position facing the cantilever 55.

The scanning mechanism 70 is for scanning the cantilever 55 along the X-, Y-, and Z-axes, and has a detailed arrangement as described in the second modification of the third embodiment (FIGS. 10A and 10B). The scanning mechanism 70 is held by a lens frame (not shown).

The cantilever 55 includes, at the free end of a flexible lever portion, a mechanical probe 57 arranged to face the sample 80. The cantilever 55 is displaced along the Z-axis in accordance with interaction with the sample 80.

The laser source 82, beam splitter 84, wave plate 85, and multi-segments detector 86 constitute an optical displacement sensor for optically detecting the displacement of the free end of the cantilever 55 along the Z-axis, and are held by a lens frame, not shown. The optical displacement sensor constituted by these components is, e.g., an optical lever sensor, which is frequently used in a scanning probe microscope. A collimated laser beam 83 emitted by the laser source 82 enters a single lens 71 provided in the scanning mechanism 70 through the beam splitter 84 and wave plate 85, thereby forming a converged spot having a diameter of approximately 2 μm on the cantilever 55. The reflected light that has passed through the wave plate 85 is deflected by the beam splitter 84, and then enters the multi-segments detector 86. The multi-segments detector 86 outputs, to the controller 89, a displacement signal reflecting the Z displacement of the cantilever 55.

The Z piezo driver 87 is for driving two piezoelectric elements 54 and 61 mounted in the scanning mechanism 70.

The X-Y piezo driver 88 is for driving piezoelectric elements 12A, 12B, and 34 mounted in the scanning mechanism 70. The X-Y piezo driver 88 has the same function as that of the X-Y piezo driver 20 shown in FIG. 2.

The controller 89 is for controlling the Z piezo driver 87 and X-Y piezo driver 88.

The host computer 91 constitutes a processing unit to acquire physical information of the sample 80 based on displacement information of the cantilever 55 and scanning information of the scanning mechanism 70.

The scanning probe microscope according to the fourth embodiment operates as follows.

The optical displacement sensor constituted by the laser source 82, beam splitter 84, wave plate 85, and multi-segments detector 86 is, e.g., an optical lever sensor, which is frequently used in a scanning probe microscope. The collimated laser beam 83 emitted by the laser source 82 forms a converged spot having a diameter of about several μm on the cantilever 55 through the single lens 71 provided in the scanning mechanism 70. The multi-segments detector 86 receives the reflected light to detect the Z displacement of the mechanical probe 57 at the free end of the cantilever 55. The multi-segments detector 86 outputs, to the controller 89, a displacement signal reflecting the Z displacement of the cantilever 55.

The controller 89 generates an X-Y scanning signal for raster scanning in the X and Y directions, and supplies the X-Y scanning signal to the X-Y piezo driver 88 and host computer 91. The controller 89, which includes the Z control unit 90, generates a Z scanning signal for controlling the Z piezo driver 87 so that displacement information of the cantilever 55 obtained by the multi-segments detector 86 is kept constant, and then supplies the Z scanning signal to the Z piezo driver 87 and host computer 91.

The Z piezo driver 87 amplifies, by a predetermined gain, the Z scanning signal supplied from the controller 89 to generate a Z driving signal, and then supplies the Z driving signal to the two piezoelectric elements 54 and 61 mounted in the scanning mechanism 70.

The X-Y piezo driver 88 amplifies, by a predetermined gain, the X-Y scanning signal supplied from the controller 89 to generate an X-Y driving signal, and then supplies the X-Y driving signal to the piezoelectric elements 12A, 12B, and 34 mounted in the scanning mechanism 70. More specifically, the X-Y piezo driver 88 amplifies an X scanning signal supplied from the controller 89 to generate an X driving signal, supplying it to the piezoelectric element 12A, at the same time, generates an opposite-phase signal of the X scanning signal (to be referred to as an opposite-phase X scanning signal) supplied from the controller 89, amplifying it to generate an opposite-phase X driving signal, supplying it to the piezoelectric element 12B, and amplifies the Y scanning signal supplied from the controller 89 to generate a Y driving signal, supplying it to the piezoelectric element 34.

The host computer 91 constructs the three-dimensional image of the surface shape of the sample 80 based on the X-Y scanning signal and Z scanning signal supplied from the controller 89, and then displays the three-dimensional image on a monitor.

By using the scanning mechanism 70, the scanning probe microscope has high precision and high rectilinear propagation and is capable of high-speed raster scanning. The scanning probe microscope therefore improves the observation resolution and shortens the observation time.

In the fourth embodiment, the same effects as those described above are obtained even when the scanning mechanism 70 is replaced with the scanning mechanism 50 shown in FIGS. 5A, 5B, and 5C or the scanning mechanism 60 shown in FIGS. 9A and 9B.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning mechanism to scan a scanning target object at a first speed in an X direction and at a second speed in a Y direction perpendicular to the X direction, comprising:
   a movable stage to which the scanning target object is attached; and
   an X-Y actuator to scan the movable stage in the X direction at the first speed, the first speed being faster than the second speed, and in the Y direction at the second speed, the X-Y actuator being symmetrical with respect to a straight line parallel to the Y direction and asymmetrical with respect to a straight line parallel to the X direction, wherein the X-Y actuator comprises a first X actuator, a second X actuator and a single Y actuator, the first X actuator and the second X actuator configured to scan the movable stage in the X direction and the Y actuator configured to scan the movable stage in the Y direction.

2. The scanning mechanism according to claim 1, further comprising a fixed frame surrounding the movable stage,
   wherein the first and second X actuators are arranged on both sides of the movable stage along an X-axis between the fixed frame and the movable stage along the X-axis, and the Y actuator is arranged between the fixed frame and the movable stage along a Y-axis perpendicular to the X-axis.

3. The scanning mechanism according to claim 2, wherein the Y actuator is larger in displacement amount per unit driving signal than the first and second X actuators.

4. The scanning mechanism according to claim 3, wherein the first X actuator comprises a first multilayer piezoelectric element, the second X actuator comprises a second multilayer piezoelectric element, and the Y actuator comprises a third multilayer piezoelectric element,
   the first multilayer piezoelectric element and the second multilayer piezoelectric element are substantially identical, and
   a length of the third multilayer piezoelectric element in a displacement direction is larger than a length of each of the first and the second multilayer piezoelectric element in the displacement direction.

5. The scanning mechanism according to claim 3, wherein the first X actuator and the second X actuator comprise a first multilayer piezoelectric element and a second multilayer piezoelectric element, respectively,
   the first multilayer piezoelectric element and the second multilayer piezoelectric element are substantially identical,
   the third multilayer piezoelectric element comprises two piezoelectric elements, an A piezoelectric element and a B piezoelectric element,
   the A piezoelectric element and the B piezoelectric element being connected in series in a displacement direction through an elastic member held by the fixed frame, and
   a sum of a length of the A piezoelectric element and a length of the B piezoelectric element in a displacement direction is larger than a length of each of the first multilayer piezoelectric element and the second multilayer piezoelectric element in the displacement direction.

6. The scanning mechanism according to claim 5, wherein both the A piezoelectric element and the B piezoelectric element are substantially identical to both the first multilayer piezoelectric element and the second multilayer piezoelectric element.

7. The scanning mechanism according to claim 2, further comprising:
   first and second elastic portions provided on both sides of the movable stage along the X-axis; and
   third and fourth elastic portions provided on both sides of the movable stage along the Y-axis, the first to fourth elastic portions being formed integrally with the movable stage, the first elastic portion being arranged between the movable stage and the first X actuator, the second elastic portion being arranged between the movable stage and the second X actuator, the third elastic portion being arranged between the movable stage and the Y actuator, and the fourth elastic portion being arranged between the movable stage and the fixed frame.

8. The scanning mechanism according to claim 7, further comprising support portions supporting the first to fourth elastic portions, the support portions being formed integrally with the first to fourth elastic portions and fixed to the fixed frame.

9. The scanning mechanism according to claim 2, wherein the movable stage holds the scanning target object so that the scanning target object is symmetrical with respect to a straight line parallel to the Y-axis.

10. The scanning mechanism according to claim 9, further comprising a Z actuator held by the movable stage, the Z actuator holding a cantilever with its longitudinal direction being along the Y-axis, and scanning the cantilever in a Z direction perpendicular to an X-Y plane.

11. The scanning mechanism according to claim 10, further comprising a light converging portion to converge, to the cantilever, light for detecting a displacement of the cantilever, the light converging portion being held by the movable stage, the Z actuator and the light converging portion being arranged side by side along the Y-axis in projection to the X-Y plane.

12. The scanning mechanism according to claim 10, wherein the Z actuator includes two, substantially identical fourth multilayer piezoelectric elements capable of expanding and contracting along a Z-axis, and the two fourth multilayer piezoelectric elements extend from the movable stage to opposite sides along the Z-axis, respectively.

13. The scanning mechanism according to claim 11, wherein the light converging portion comprises a single lens.

14. The scanning mechanism according to claim 13, wherein the single lens has a diameter equal to or smaller than 10 mm.

15. The scanning mechanism according to claim 13, wherein the single lens has an NA (Numerical Aperture) equal to or larger than 0.4.

16. The scanning mechanism according to claim 13, wherein the Z actuator holds the cantilever at an angle of 5 degrees to 20 degrees with respect to the X-Y plane, and
   the single lens is held by the movable stage to form an angle of 5 degrees to 20 degrees by an optical axis of the single lens with respect to the Z-axis.

17. A scanning probe microscope comprising a scanning mechanism according to claim 1.

18. The scanning mechanism according to claim 1, wherein X-Y actuator comprises less actuators in the Y direction than in the X direction.

19. The scanning mechanism according to claim 1, wherein the X-Y actuator consists of one Y-actuator.

20. The scanning mechanism according to claim 1, wherein the Y actuator comprises at least one piezoelectric element, wherein the at least one piezoelectric element is positioned such that a straight line passing through the center of the piezoelectric element passes through the center of gravity of the movable stage.

21. The scanning mechanism according to claim 1, wherein the first X actuator is operably connected to a first side of the movable stage, the second X actuator is operably connected to a second side of the movable stage and the single Y actuator is operably connected to a third side of the movable stage.

22. A scanning mechanism to scan a scanning target object at a first speed in an X direction and at a second speed in a Y direction perpendicular to the X direction, comprising:
   a movable stage to which the scanning target object is attached; and
   a first X actuator operably connected to a first side of the movable stage, a second X actuator operably connected to a second side of the movable stage and a Y actuator consisting of a single Y actuator operably connected to a third side of the movable stage, to scan the movable stage in the X direction at the first speed, the first speed being faster than the second speed, and in the Y direction at the second speed, the first X actuator, the second X actuator and the Y actuator being symmetrical with respect to a straight line parallel to the Y direction and asymmetrical with respect to a straight line parallel to the X direction, the first X actuator and the second X actuator configured to scan the movable stage in the X direction and the Y actuator configured to scan the movable stage in the Y direction.

23. The scanning mechanism of claim 22, wherein the Y actuator is arranged on a straight line passing through a center of gravity of the movable portion and parallel to a Y-axis, and also arranged on one side of the movable portion.

24. The scanning mechanism of claim 22, further comprising a driver to supply the first X actuator and the second X actuator with driving signals having opposite phases to each other to cause the first X actuator and the second X actuator to perform a push-pull operation.

25. The scanning mechanism of claim 1, wherein the movable stage and the X-Y actuator are arranged on a same plane.

* * * * *